(12) United States Patent
Lin et al.

(10) Patent No.: US 10,977,411 B1
(45) Date of Patent: Apr. 13, 2021

(54) METHOD FOR GENERATING PACKING SOLUTION OF PRINTED CIRCUIT BOARD

(71) Applicants: Inventec (Pudong) Technology Corporation, Shanghai (CN); INVENTEC CORPORATION, Taipei (TW)

(72) Inventors: Yu-Sheng Lin, Taipei (TW); Trista Pei-Chun Chen, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/929,656

(22) Filed: Jul. 15, 2020

(30) Foreign Application Priority Data

Jun. 15, 2020 (CN) .......................... 202010541059.7

(51) Int. Cl.
*G06F 30/392* (2020.01)
*H05K 3/36* (2006.01)
*G06N 3/12* (2006.01)

(52) U.S. Cl.
CPC .......... *G06F 30/392* (2020.01); *G06N 3/126* (2013.01); *H05K 3/366* (2013.01)

(58) Field of Classification Search
CPC .................................................... G06F 30/392
USPC ........................................................ 716/122
See application file for complete search history.

(56) References Cited

U.S. PATENT DOCUMENTS

| 8,918,750 | B1 * | 12/2014 | Moffitt | ................ | G06F 30/18 |
| | | | | | 716/122 |
| 2009/0031273 | A1 * | 1/2009 | Tsai | ................ | G06N 3/126 |
| | | | | | 716/119 |

* cited by examiner

*Primary Examiner* — Eric D Lee
(74) *Attorney, Agent, or Firm* — Locke Lord LLP; Tim Tingkang Xia, Esq.

(57) ABSTRACT

A method for generating packing solution of printed circuit board (PCB) comprises: obtaining a plurality of component files, a first constraint, and a second constraint, wherein each of the component files corresponds to an electrical component, the first constraint corresponds to a signal-PCB, and the second constraint corresponds to a multiple-PCB; performing a genetic algorithm according to the plurality of component files and the first constraint files to generate a plurality of single-PCB feasible solutions, wherein each of the plurality of single-PCB feasible solutions has a shape description, performing a concave hull algorithm to update the shape description according to each of the plurality of single-PCB feasible solutions, after updating the shape description, performing the genetic algorithm according to the plurality of single-PCB feasible solutions and the second constraint to generate a multiple-PCB packing solution.

10 Claims, 9 Drawing Sheets

METHOD FOR GENERATING PACKING SOLUTION OF PRINTED CIRCUIT BOARD

CROSS-REFERENCE TO RELATED APPLICATIONS

This non-provisional application claims priority under 35 U.S.C. § 119(a) on Patent Application No(s). 202010541059.7 filed in China on Jun. 15, 2020, the entire contents of which are hereby incorporated by reference.

BACKGROUND

1. Technical Field

This disclosure relates to a printed circuit board (PCB), and more particularly to an arrangement method of PCB in component-level and board-level.

2. Related Art

In the printed circuit board (PCB) manufacturing industry, independent PCB components are grouped into a single-PCB, and then such PCBs are grouped again into a larger multiple-PCB. Minimizing the resulting average PCB area is critical to the manufacturing costs.

However, minimizing the PCB area requires a large amount of human efforts. The tester first tries different combinations of PCB layouts, exports the PCB board layout results, and then verify whether the results are smaller. The above flow will take a lot of time and labor costs.

SUMMARY

Accordingly, this disclosure provides a method for generating packing solution of PCB to solve the above problems.

According to an embodiment of the present disclosure, a method for generating packing solution of printed circuit board (PCB) comprising: obtaining a plurality of component files, a first constraint, and a second constraint, wherein each of the component files corresponds to an electrical component, the first constraint corresponds to a single-PCB, and the second constraint corresponds to a multiple-PCB; performing a genetic algorithm according to the plurality of component files and the first constraint to generate a plurality of single-PCB feasible solutions, wherein each of the plurality of single-PCB feasible solutions has a shape description; performing a concave hull algorithm according to each of the plurality of single-PCB feasible solutions to update the shape description; and after performing the concave hull algorithm according to each of the plurality of single-PCB feasible solutions to update the shape description, performing the genetic algorithm according to the plurality of single-PCB feasible solutions and the second constraint to generate a multiple-PCB packing solution.

In sum, the method for generating packing solution of PCB can deal with the combination with arbitrary component shapes, with physical limitations imposed by board-level, copper wire etc. The present disclosure may pack components into a PCB and make the PCB area as small as possible or the PCB area utilization rate as large as possible. The present disclosure uses a bottom-up approach together with the genetic algorithm based optimization to reduce the workloads and time required to generate good PCB packing results. The present disclosure not only reduces the search space of feasible solutions, but also greatly minimizes the computation time. Therefore, the present disclosure can achieve a near-optimal solution in a short amount of time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for generating packing solution of printed circuit (PCB) board proposed by the present disclosure is configured to pack a plurality of electrical components into one or more single-PCBs, and then pack said one or more single-PCBs into a multiple-PCB. The electrical component may be non-convex and contain holes. The electrical component can be rotated in a finite set of orientations, e.g. every 90 degrees.

Figure 1:
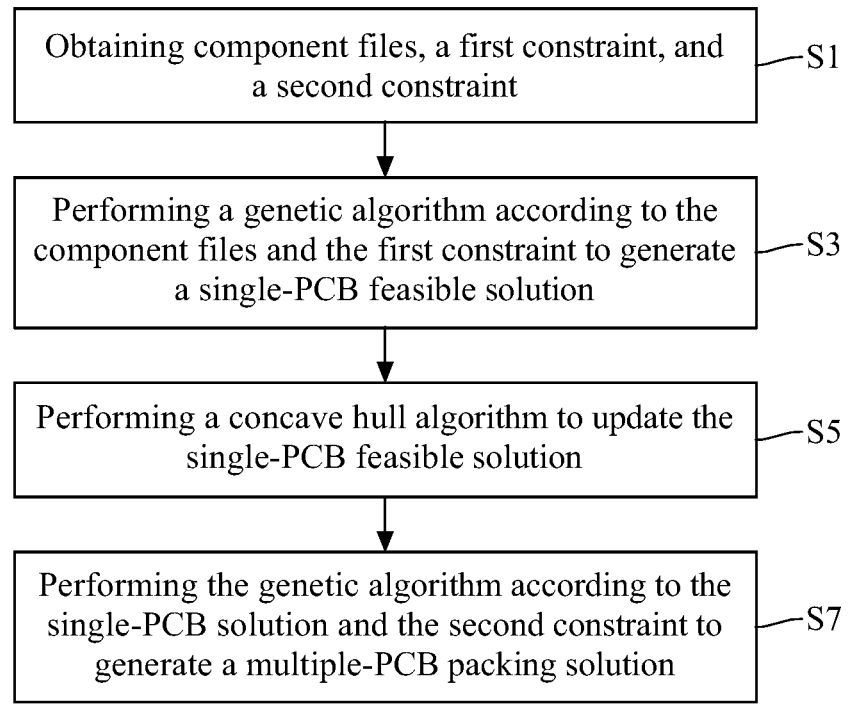
FIG. 1 is a flow chart according to an embodiment of the present disclosure.

Please refer to FIG. 1, which illustrates a flow chart according to an embodiment of the present disclosure.

Step S1 shows "obtaining component files, a first constraint, and a second constraint". Each of the component files corresponds to an electrical component (hereinafter referred to as "component"). The present disclosure determines a set of components that will be assembled by obtaining component files.

The first constraint corresponds to a single-PCB, and the second constraint corresponds to a multiple-PCB. For example, the first constraint comprises a maximal dimension of the single-PCB. If the specification of the single-PCB is rectangular, the maximal dimension comprises a length and a width of the single-PCB. The second constraint comprises a maximal number of single-PCBs that can be disposed on one multiple-PCB, this number is also called "panelization number". The second constraint further comprises a minimal side length of the multiple-PCB. It should be noticed that contents of the first and second constraints are not limited to the above examples. For another example, a break-away size or a number of tooling holes may be set in the first and second constraints respectively.

Figure 2:
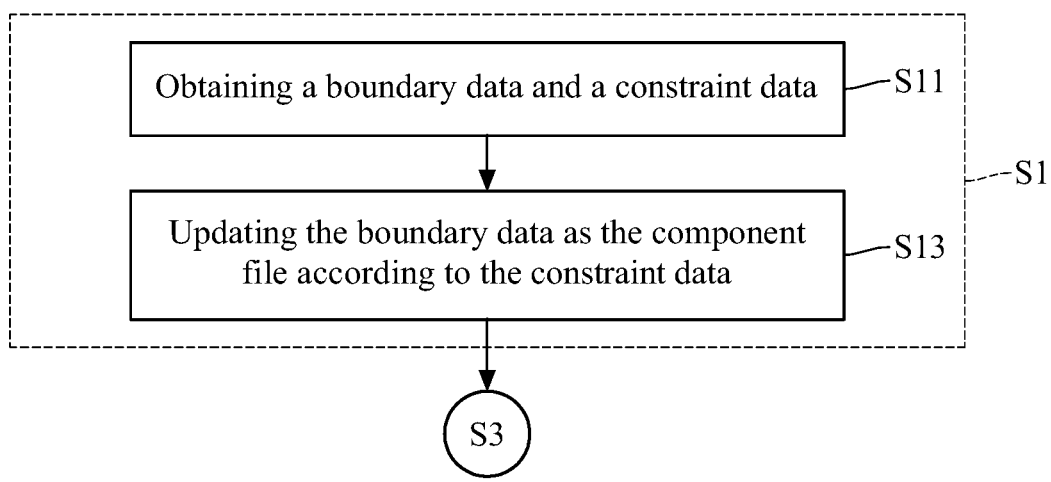
FIG. 2 is a detailed flow chart of step S1 in FIG. 1.

Please refer to FIG. 2, which illustrates a detailed flow chart of "obtaining component files" of step S1 in FIG. 1.

S11 shows "obtaining a boundary data and a constraint data". For example, the boundary data and the constraint data are stored in a drawing exchange format (DXF) file. The DXF file records the appearance information (i.e., boundary data) and assembly constraints (i.e., constraint data) of a component.

Figure 3:
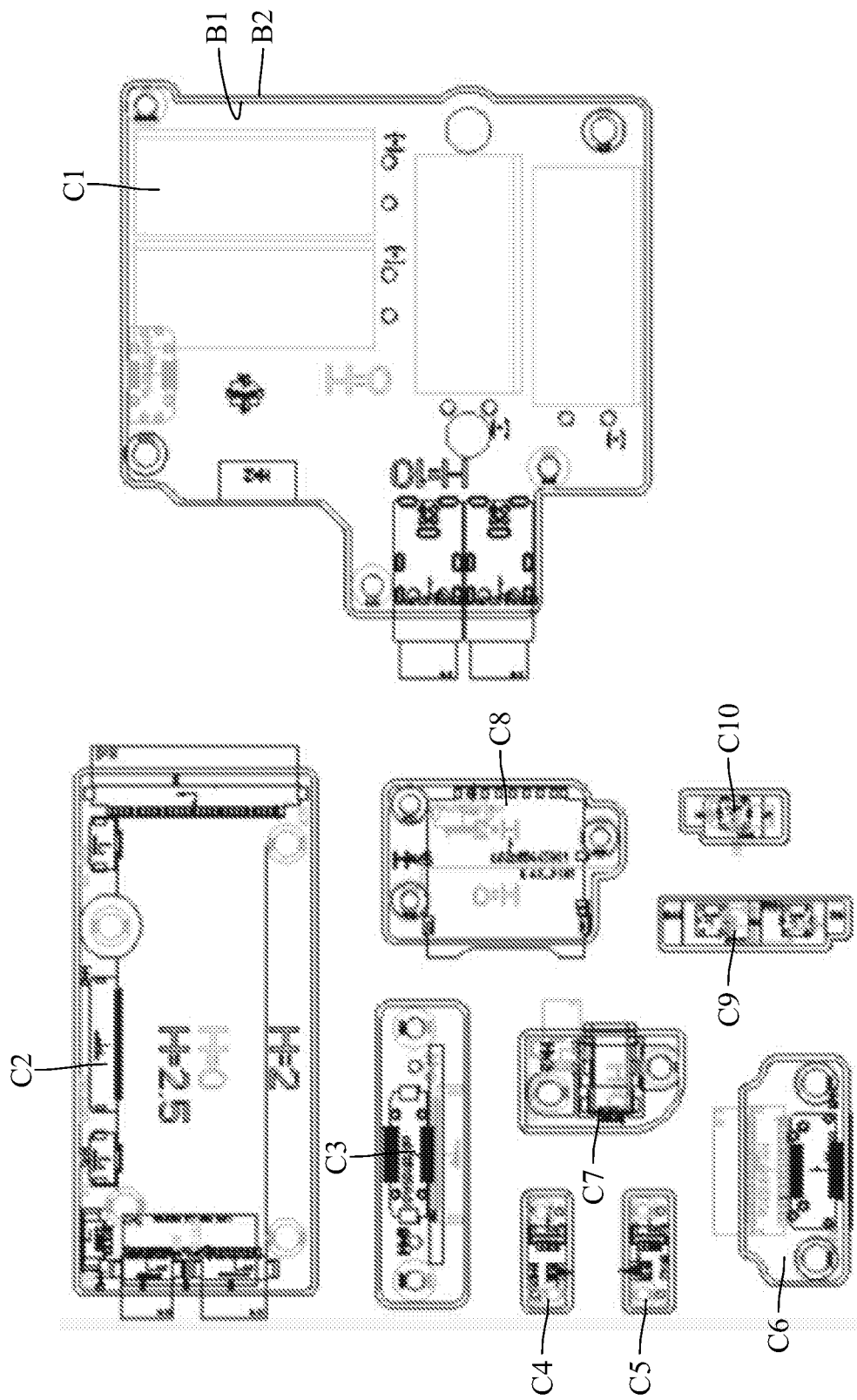
FIG. 3 is a schematic diagram of a plurality of electrical components.

S13 shows "updating the boundary data as the component file according to the constraint data". Please refer to FIG. 3, which illustrates a schematic diagram of a plurality of electrical components C1-C10. As shown in FIG. 3, a component may not be a simple polygon shape since it contains extra information such as the PCB label and copper conductor. If said shape are directly used as the input of following steps, the result will be unacceptable.

Therefore, step S13 performs a preprocessing task according to the DXF files obtained in step S11. Specifically, after extracting the original boundary data from the DXF file, step S13 converts the boundary data into a scalable vector graphics (SVG) file by a dxf2svg program, reads the boundary data of the document object model (DOM) in the SVG file by Javascript, and generates the layout boundary as the component file according to the constraint associated with the component size. The layout boundary is an updated boundary data according to the constraint of the component. As shown in FIG. 3, the boundary data of the DXF file of the component C1 corresponds to the outline B1, and the updated boundary data according to the constraint in SVG file (component file) corresponds to the outline B2.

Please refer to FIG. 1. Step S3 shows "performing a genetic algorithm according to the component files and the first constraint to generate a single-PCB feasible solution". Specifically, the embodiment of the present disclosure uses a bottom-up genetic algorithm twice, and thus a first stage genetic algorithm and a second stage genetic algorithm are defined. Step S3 is a step performing the first stage genetic algorithm. Regarding the genetic algorithm, the chromosomes are the plurality of components randomly encoded, the "population size" is the number of outputted single-PCB feasible solutions, the mutation rate is the probability that the encoded bits are replaced. The single-PCB solution represents a feasible solution for assembling multiple components into a single-PCB.

In the process of performing the genetic algorithm, each component is assembled in order according to its encoded value to generate a single-PCB preliminary solution, and a fitness function is used to calculate the parameters of each child (single-PCB preliminary solution). The better child is selected as the single-PCB feasible solution according to the calculation results and default thresholds of these parameters, and the next iteration is performed to generate a new assembly order or a new assembly rule. The genetic algorithm adjusts the conditions of component assembly, such as the assembly order or the rotation angle placed on the substrate at each iteration. Regarding the termination condition of the genetic algorithm, for example, the number of iterations reaches a specified value, or the fitness value outputted by the fitness function is convergent or reaches a specified threshold. The dimension (estimation parameter) of the fitness function comprises: the minimum space of components; the curve tolerance, i.e., the maximum error allowed for linear approximations of Bezier paths and arcs, in SVG units or "pixels", and this value will be decreased if curved parts appear to slightly overlap; and component rotation, i.e., the possible number of rotations to evaluate for each component, e.g., 4 for only the cardinal directions, wherein the larger value of the component rotation may improve results, but will be slower to converge.

Figure 4:
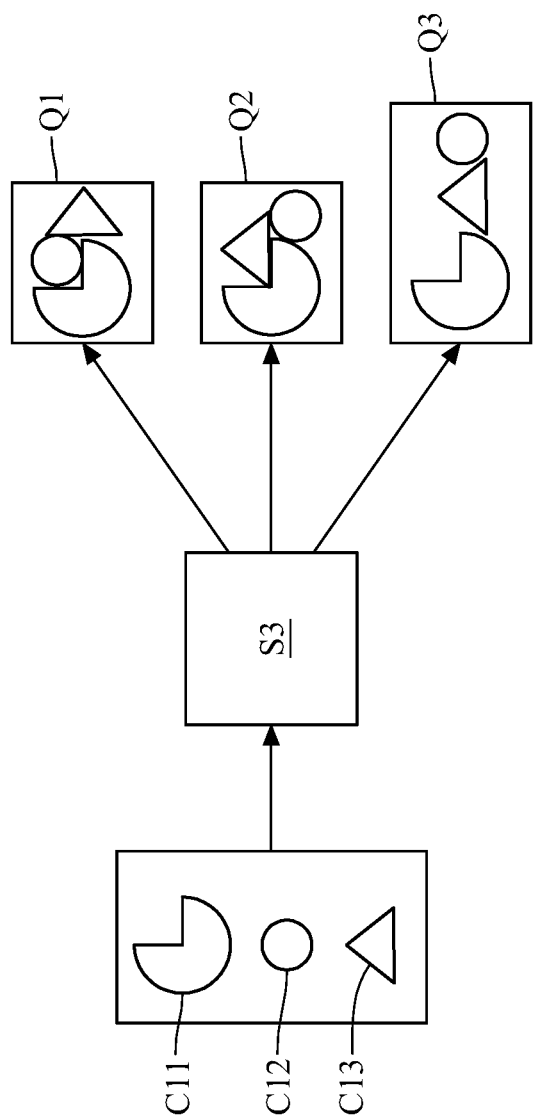
FIG. 4 is a schematic diagram of step S3 in FIG. 1.

Please refer to FIG. 4, which illustrates a schematic diagram of step S3 in FIG. 1. The left part of FIG. 4 shows components C11, C12 and C13. The right part of FIG. 4 shows single-PCB feasible solutions Q1, Q2 and Q3 that are generated after step S3 is performed. In the example of FIG. 4, the available number of each of components C11, C12, and C13 are one, however, the present disclosure is not limited thereof.

Figure 5:
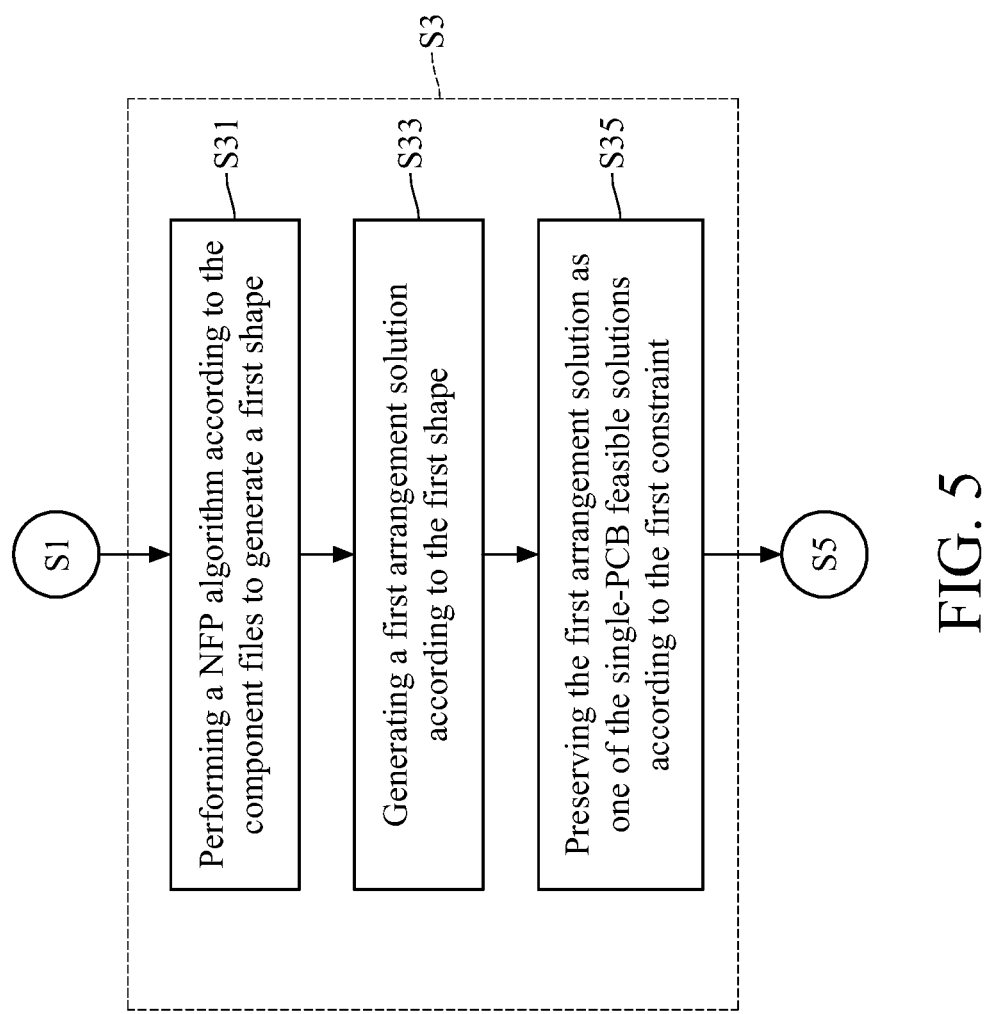
FIG. 5 is a detailed flow chart of step S3 in FIG. 1.

Please refer to FIG. 5, which illustrates a detailed flow chart of step S3 in FIG. 1. For example, starting from the component with the minimal encoded value, this component will be assembled on the substrate, and then the component with the second small encoded value is assembled next to the component with the minimal encoded value. During the assembly process, steps S31 and S33 are further included.

S31 shows "performing a NFP algorithm according to the component files to generate a first shape". For example, this step selects two component files corresponding to two components, and performs NFP (no-fit polygon) algorithm to generate a first shape according to two layout boundaries described in these two component files. The first shape is a non-overlapping possible assembled shape containing these two components. Specifically, given two polygons A and B and their respective reference vertices RA and $R_B$, the NFP algorithm may output a polygon NFPA, B representing all possible positions for which polygon B touches but does not overlap with polygon A. In other words, the no-fit polygon NFPA, B can be found by tracing the polygon B around the boundary of the polygon A. The polygon A remains fixed at RA and the other traverses around the fixed polygon's edges with $R_B$ while ensuring that the polygons always touch but never intersect. The present disclosure does not limit the NFP algorithm configured to generate the first shape.

Step S33 shows "generating a first arrangement solution according to the first shape". Since NFPA, B includes a plurality of arrangement candidates of components A and B, when performing the genetic algorithm, one or more of these arrangement candidates will be selected, for example, in a random manner, as the first arrangement solution. Using the NFP algorithm can quickly generate a first arrangement solution in which two components are closely connected to each other.

Step S35 shows "preserving the first arrangement solution as one of the single-PCB feasible solutions according to the first constraint". Specifically, the genetic algorithm estimates according to a plurality of rules defined in the first constraint to preserve the qualified first arrangement solution. Every time an iteration is finished, the fitness function of the genetic algorithm will estimate whether to preserve the first arrangement solution generated this time to serve as a single-PCB feasible solution according to parameters described above. The genetic algorithm may generate a plurality of single-PCB feasible solutions according to a default number of generations.

Step S5 shows "performing a concave hull algorithm to update the single-PCB feasible solution". When the shape of the single-PCB solution generated in step S3 is non-convex, step S5 will be performed. In an embodiment of the present disclosure, step S5 is performed selectively.

Figure 6:
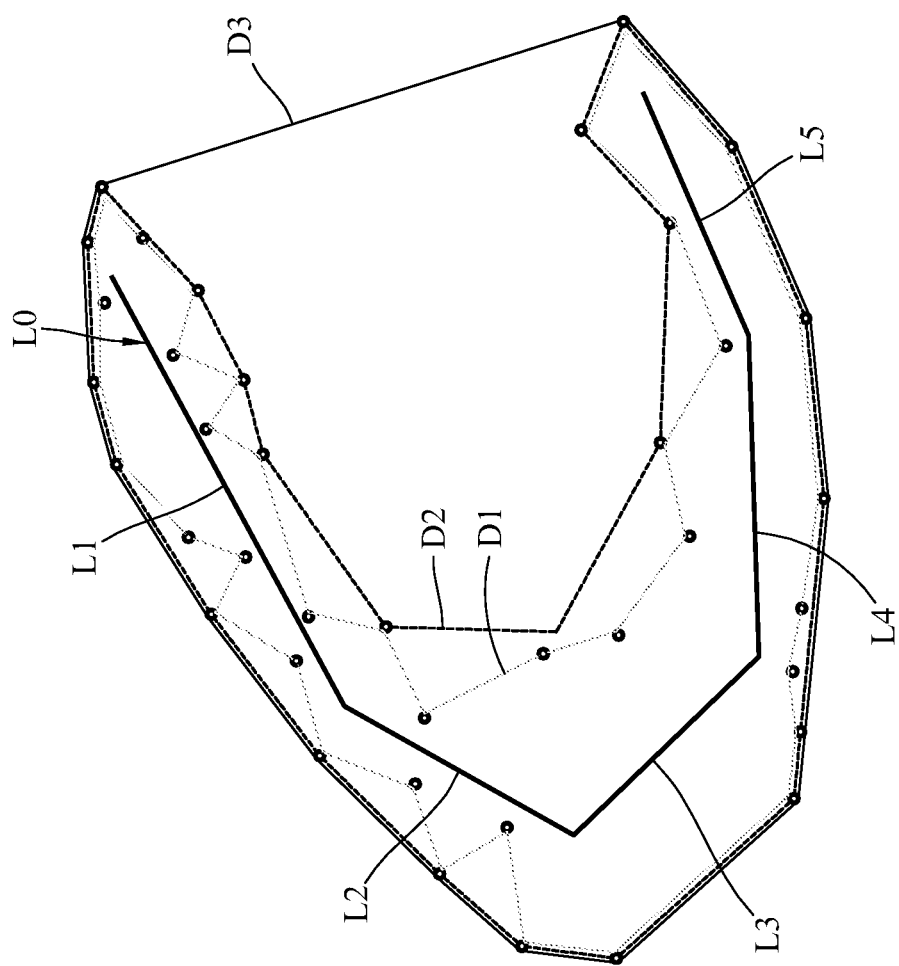
FIG. 6 is a schematic diagram of step S5 in FIG. 1.

Specifically, each single-PCB feasible solution has a shape description. The step S5 performs a concave hull algorithm according to each single-PCB solution generated in step S3. The shape description records how components are assembled in the single-PCB feasible solution and a shape of the single-PCB. Please refer to FIG. 6, which illustrates shapes before performing step S5 and after performing step S5. As shown in FIG. 6, D1 is the shape of a single-PCB, D2 is the shape of the updated single-PCB after performing the concave hull algorithm according to D1. D3 is the shape outputted by perform a convex hull algorithm according to D1 and is served as a control group.

As shown in FIG. 6, the shape of D1 is relatively irregular. If D1 is used as a unit for assembling a multiple-PCB, it may increase the difficulty of the process of the genetic algorithm of the second stage. Therefore, the present disclosure performs the concave hull algorithm to generate the shape D2 that contains D1 and is easy to assemble. Compared with D3, which directly converts D1 into a convex polygon, D2 can save the area where no components are placed on the substrate, that is, improve the substrate utilization and avoid waste of space. It should be noticed that the present disclosure does not limit which concave hull algorithm is used.

In an embodiment, the radius parameter of the concave hull algorithm is twice the length of all short sections in the shape description. In general, any of concave hull algorithms requires one radius parameter that shall be assigned manually. The smaller the radius is, the more precise the shape of the hull is. However, a smaller radius can also erode the shape too aggressively and increase the difficulty of assembly. In order to overcome this problem, the present disclosure uses a linear approximation method to generate a representative long side L0 of the shape D1. The long side D1 is referred to as the skeleton of the shape D1. The long side will be forcibly split into a plurality of shorter sides connected to each other, as shown in short sections L1-L5 of FIG. 6, and said radius parameters that should be set in the concave hull algorithm will be set to twice of lengths of these short sections L1-L5. However, the present disclosure does not limit to the above exemplary numbers. In practical, the value of the radius parameter or its ratio to the short section can be adjusted adaptively when the substrate utilization rate or whether it is suitable to place the component in the central part of the concave is under consideration.

In an embodiment, after obtained short sections L1-L5, the present disclosure returns to step S3 to fix rules which is used by the genetic algorithm in step S3 and is configured to arrange components. For example, if the short section L1 comprises components C14-C18 (not depicted), the arrangement solution of components C14-C18 may be fixed in the iterations of step S3.

Through the correction steps described above, after the genetic algorithm of the first stage is finished, the number of single-PCB feasible solutions with a concave shell shape can be reduced. In general, convex polygons are easier to assemble than concave polygons. Therefore, the results of the concave shell algorithm in step S5 are returned to step S3 for correction, it is expected to improve the execution efficiency of the genetic algorithm of the second stage.

S7 shows "performing the genetic algorithm according to the single-PCB solution and the second constraint to generate a multiple-PCB packing solution". After step S5, "updating each of the single-PCB feasible solutions by performing the concave hull algorithm", step S7 performs the genetic algorithm of the second stage. The operation of step S7 is similar to that of step S3, while the difference is that the input data of step S7 is single-PCB feasible solutions and the output data of step S7 is a multiple-PCB packing solution.

Figure 7:
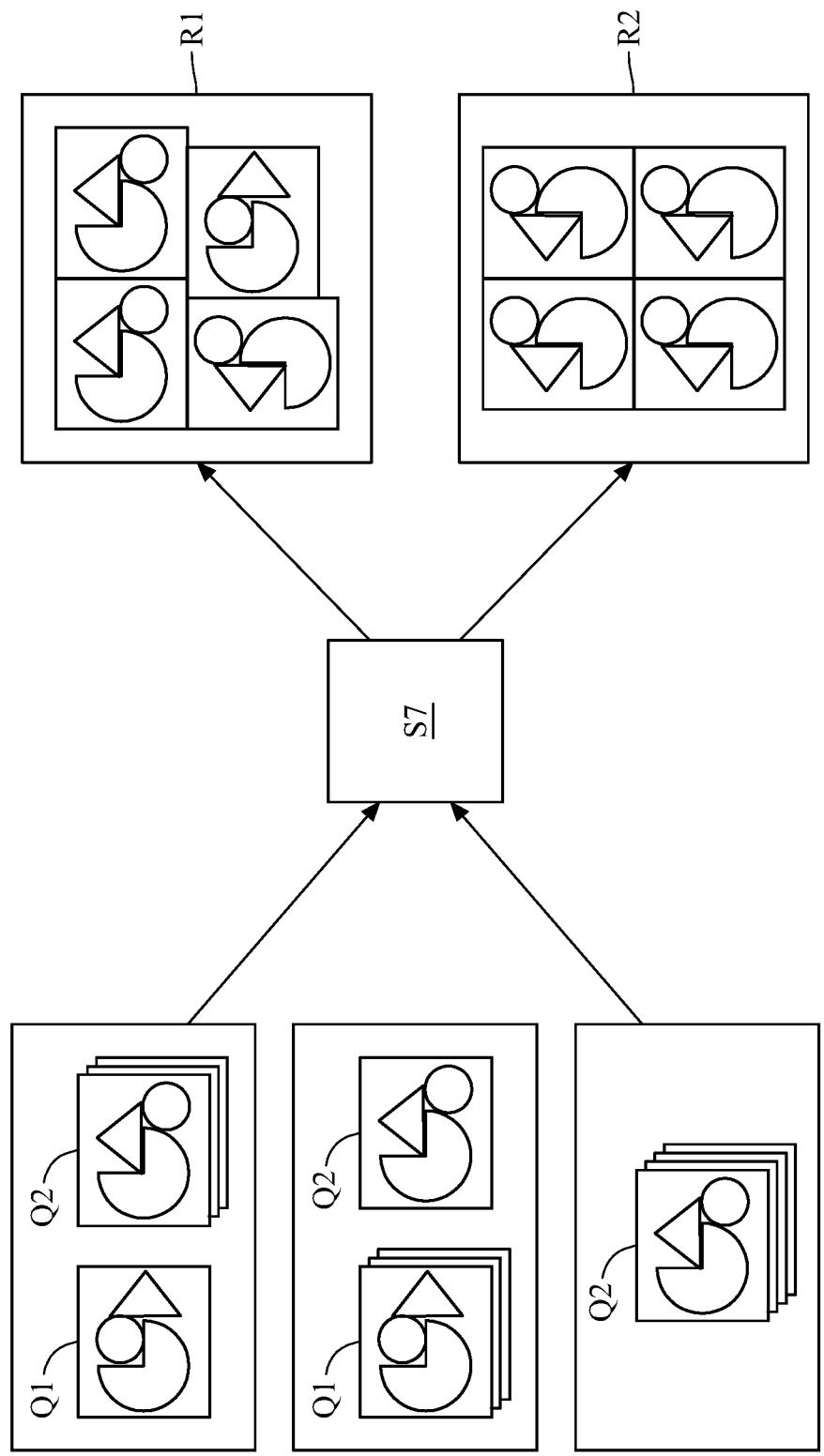
FIG. 7 is a schematic diagram of step S7 in FIG. 1.

Please refer to FIG. 7, which illustrates a schematic diagram of step S7 in FIG. 1. The left side of FIG. 7 has single-PCB feasible solutions Q1 and Q2. The right side of FIG. 7 have the first two multiple-PCB packing solutions after step S7 is performed.

The second constraint comprises a minimal side length of the multiple-PCB. The maximal number of single-PCBs that a multiple-PCB can accommodate is defined in the second constraint, and this maximal number is set to 4 is the example shown in FIG. 6. Therefore, the genetic algorithm generates 3 combinations including one Q1 and three Q2, three Q1 and one Q2, and four Q2. In should be noticed that the above numbers are examples and are not intended to limit the present disclosure.

Figure 8:
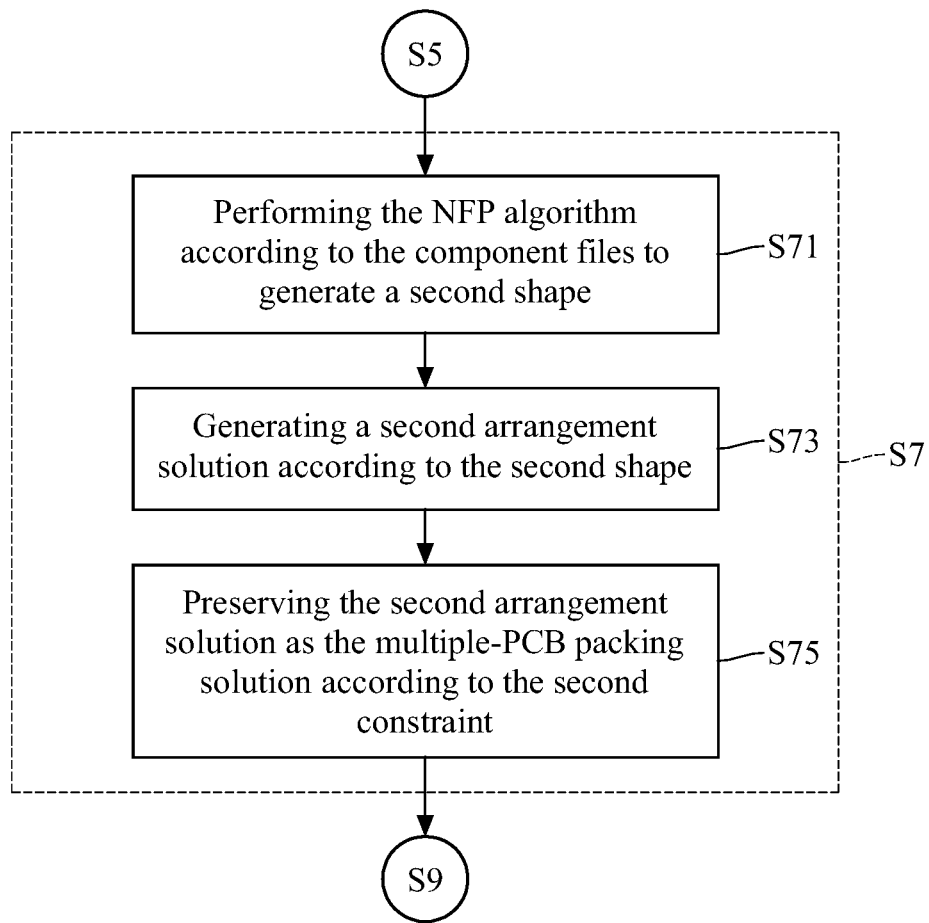
FIG. 8 is a detailed flow chart of step S7 in FIG. 1.

Please refer to FIG. 8, which illustrates a detailed flow chart of step S7 in FIG. 1. Step S71 shows that "performing the NFP algorithm according to the component files to generate a second shape", step S73 shows "generating a second arrangement solution according to the second shape", and step S75 shows "preserving the second arrangement solution as the multiple-PCB packing solution according to the second constraint". Steps S71-S75 can be implemented by adaptively modify steps S31-S35 and the present disclosure does not repeat herein.

Figure 9:
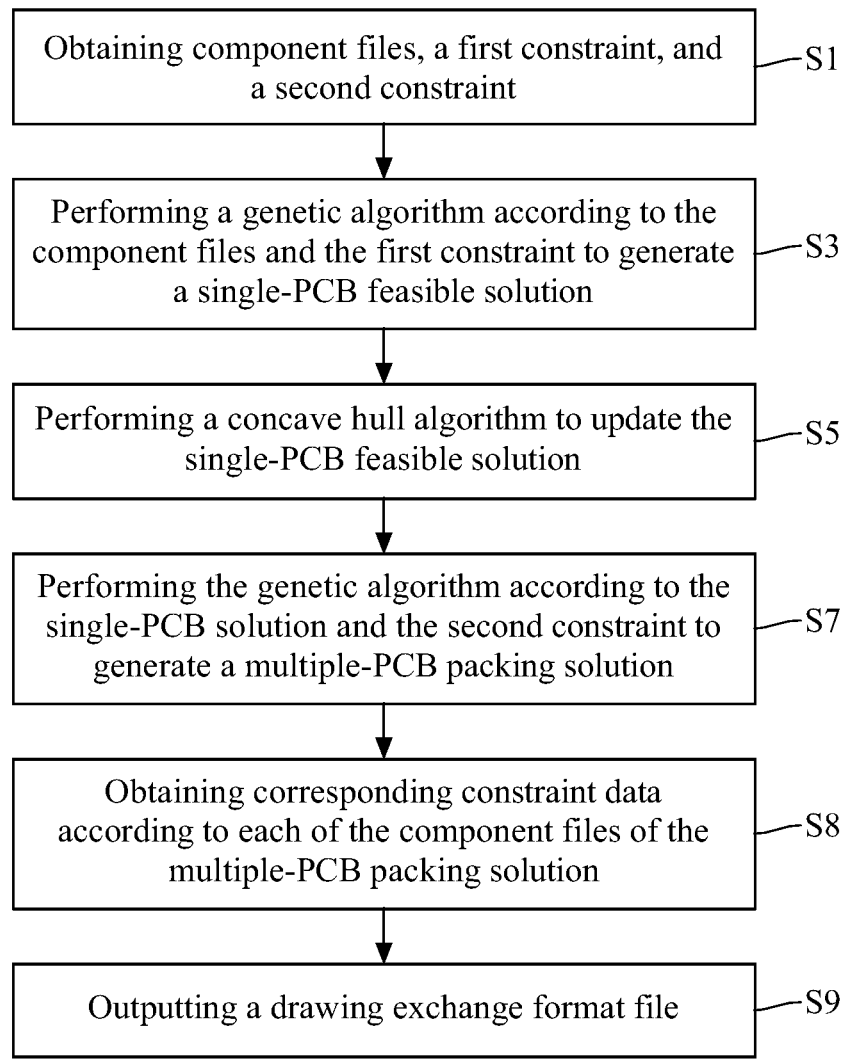
FIG. 9 is a flow chart according to another embodiment of the present disclosure.

Please refer to FIG. 9, which illustrates a flow chart according to another embodiment of the present disclosure. Steps S1-S7 of said another embodiment are basically identical to the previous embodiment, and the present disclosure does not repeat herein.

In said another embodiment, the method for generating packing solution of PCB further comprises step S8 and step S9 after step S7.

Step S8 shows "obtaining corresponding constraint data according to each of the component files of the multiple-PCB packing solution". Specifically, in the PCB layout stage, in addition to the multiple-PCB packing solution generated in step S7, it also requires to take the constraint of each component into consideration. Therefore, when a SVG component file is outputted in step S13 and the corresponding constraint is removed from the outputted file, the deleted content will be recorded, and will be recovered into the corresponding component when step S8 is performed.

Step S9 shows "outputting a drawing exchange format file". After the removed constraint of the component in the multiple-PCB packing solution is recovered, the DXF files will be outputted and be used in layout stage.

Figure 10:
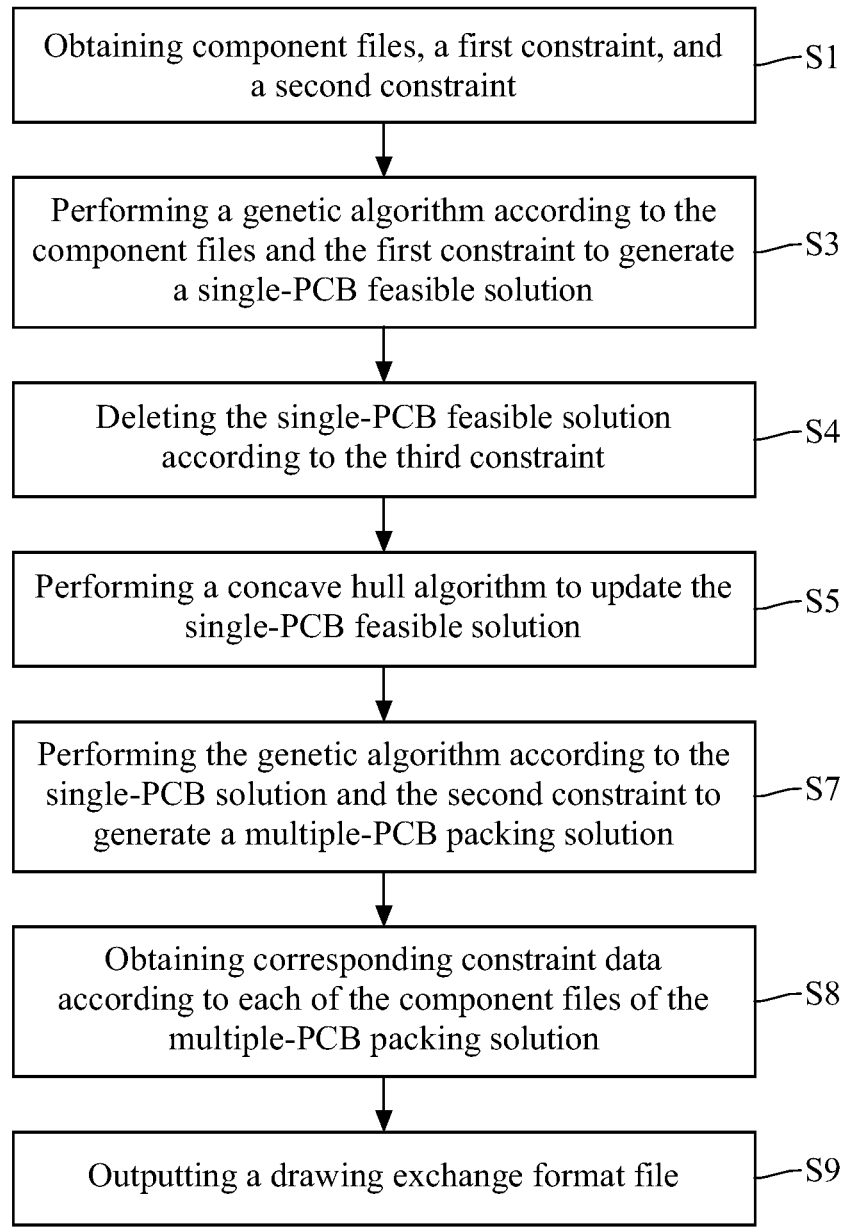
FIG. 10 is a flow chart according to further another embodiment of the present disclosure.

Please refer to FIG. 10, which is a flow chart according to further another embodiment of the present disclosure. Steps S1-S3 and S5-S9 of said further another embodiment are basically identical to the previous embodiment and will not be repeated herein. In said further another embodiment, the method for generating packing solution of PCB further comprises the step S4, which is performed between steps S3 and S5.

S4 shows "deleting the single-PCB feasible solution according to the third constraint". Specifically, in order to speed up the subsequent packaging process and reduce the solution space for finding feasible solutions, the method proposed in the present disclosure can be interrupted when the genetic algorithm of the first stage is finished, loads the specified third constraint, and deletes one or more single-PCB feasible solutions which do not follow the rules defined in the third constraint. For example, the rule, "the number of resistors in a single-PCB should be less than 100", may be one of the rules defined in the third constraint. Therefore, those single-PCB feasible solutions whose total resistor numbers violate the rule will be deleted. The step S4 may accelerate the speed to perform step S7. For another example, the third constraint defines the upper limit of the weight of the components on a single-PCB, and this rule can avoid the risk of excessive components falling due to the remelting of solder paste when the PCB passes through the reflow oven.

The heat absorption coefficient of the element can also be defined in the third constraint. Generally speaking, the rules defined in the third constraint file are related to the parameters not associated with the shape but should be considered during actual assembly process of components.

In sum, the method for generating packing solution of PCB can deal with the combination with arbitrary component shapes, with physical limitations imposed by board-level, copper wire etc. The present disclosure may pack components into the PCB and make the PCB area as small as possible or the PCB area utilization rate as large as possible. The present disclosure uses a bottom-up approach together with the genetic algorithm based optimization to reduce the workloads and time required to generate good PCB packing results. The present disclosure not only reduces the search space of feasible solutions, but also greatly minimizes the computation time. Therefore, the present disclosure can achieve a near-optimal solution in a short amount of time.

What is claimed is:

1. A method for generating packing solution of printed circuit board (PCB) comprising:
   obtaining a plurality of component files, a first constraint, and a second constraint, wherein each of the component files corresponds to an electrical component, the first constraint corresponds to a single-PCB, and the second constraint corresponds to a multiple-PCB;
   performing a genetic algorithm according to the plurality of component files and the first constraint to generate a plurality of single-PCB feasible solutions, wherein each of the plurality of single-PCB feasible solutions has a shape description;
   performing a concave hull algorithm according to each of the plurality of single-PCB feasible solutions to update the shape description; and
   after performing the concave hull algorithm according to each of the plurality of single-PCB feasible solutions to update the shape description, performing the genetic algorithm according to the plurality of single-PCB feasible solutions and the second constraint to generate a multiple-PCB packing solution.

2. The method for generating packing solution of PCB of claim 1, performing the genetic algorithm according to the plurality of component files and the first constraint to generate the plurality of single-PCB feasible solutions comprising:
   performing a no-fit polygon (NFP) algorithm according to the plurality of component files to generate a first shape of two of the plurality of component files;
   performing the genetic algorithm according to the first shape to generate a first arrangement solution; and
   preserving the first arrangement solution as one of the plurality of single-PCB feasible solutions.

3. The method for generating packing solution of PCB of claim 1, performing the genetic algorithm according to the plurality of single-PCB feasible solutions and the second constraint to generate the multiple-PCB packing solution comprising:
   performing a NFP algorithm according to each of the plurality of single-PCB feasible solutions to generate a second shape of two of the plurality of single-PCB feasible solutions;
   performing the genetic algorithm according to the second shape to generate a second arrangement solution; and
   performing the genetic algorithm according to the second constraint to preserve the second arrangement solution as the multiple-PCB packing solution.

4. The method for generating packing solution of PCB of claim 1, obtaining the plurality of component files, the first constraint, and the second constraint comprising:
   obtaining a boundary data and a constraint data, wherein the boundary data and the constraint data correspond to an electrical component; and
   updating the boundary data according to the constraint data, for the boundary data to be served as one of the plurality of component files.

5. The method for generating packing solution of PCB of claim 4, wherein the boundary data and the constraint data are stored in a drawing exchange format (DXF) file, and each of the plurality of component files is a scalable vector graphics (SVG) file.

6. The method for generating packing solution of PCB of claim 4, after performing the genetic algorithm according to the plurality of single-PCB feasible solutions and the second constraint to generate the multiple-PCB packing solution, further comprising:
   with respect to the component file whose corresponding electrical component belongs to the multiple-PCB packing solution, obtaining the constraint data corresponding to said component file; and
   outputting a drawing exchange format (DXF) file including the constraint data and the multiple-PCB packing solution.

7. The method for generating packing solution of PCB of claim 4, wherein the constraint data comprises a PCB label and a copper conductor.

8. The method for generating packing solution of PCB of claim 1, wherein the first constraint comprises a maximal dimension of the single-PCB, and the second constraint comprises a minimal side length of the multiple-PCB, and a number of single-PCBs on the multiple-PCB.

9. The method for generating packing solution of PCB of claim 1, wherein the shape description comprises a long side representing a shape of the single-PCB feasible solution, the long side comprises a plurality of short sections, the concave hull algorithm comprises a plurality of radius parameters, and each of the plurality of radius parameters is associated with a length of each of the plurality of short sections.

10. The method for generating packing solution of PCB of claim 1, after performing the genetic algorithm according to the plurality of component files and the first constraint to generate the plurality of single-PCB feasible solutions, and before performing the concave hull algorithm according to each of the plurality of single-PCB feasible solutions to update the shape description, further comprising:
    deleting one of the plurality of single-PCB feasible solutions according to a third constraint.

* * * * *